US012538717B2

(12) United States Patent
Cady et al.

(10) Patent No.: US 12,538,717 B2
(45) Date of Patent: Jan. 27, 2026

(54) RESISTIVE RANDOM ACCESS MEMORY DEVICE

(71) Applicant: The Research Foundation for the State University of New York, Albany, NY (US)

(72) Inventors: Nathaniel Cady, Delmar, NY (US); Karsten Beckmann, Albany, NY (US); Joseph Van Nostrand, Rome, NY (US)

(73) Assignee: The Research Foundation for the State University of New York, Albany, NY (US)

( * ) Notice: Subject to any disclaimer, the term of this patent is extended or adjusted under 35 U.S.C. 154(b) by 713 days.

(21) Appl. No.: 17/295,920

(22) PCT Filed: Sep. 23, 2019

(86) PCT No.: PCT/US2019/052339
§ 371 (c)(1),
(2) Date: May 21, 2021

(87) PCT Pub. No.: WO2020/131179
PCT Pub. Date: Jun. 25, 2020

(65) Prior Publication Data
US 2022/0013719 A1  Jan. 13, 2022

Related U.S. Application Data

(60) Provisional application No. 62/770,262, filed on Nov. 21, 2018.

(51) Int. Cl.
*H10N 70/00*  (2023.01)
*H10N 70/20*  (2023.01)

(52) U.S. Cl.
CPC ......... *H10N 70/841* (2023.02); *H10N 70/063* (2023.02); *H10N 70/24* (2023.02); *H10N 70/826* (2023.02); *H10N 70/8833* (2023.02)

(58) Field of Classification Search
CPC .... H10N 70/841; H10N 70/24; H10N 70/826; H10N 70/8833; H10N 70/20;
(Continued)

(56) References Cited

U.S. PATENT DOCUMENTS 9,209,392 B1 * 12/2015 Sung .................... H10N 70/011
9,431,603 B1 *  8/2016 Hsieh ................... H10N 70/245
(Continued)

*Primary Examiner* — Ida M Soward
(74) *Attorney, Agent, or Firm* — Garrett M. Smith

(57) ABSTRACT

A resistive random access memory (ReRAM) device that minimizes filament formation at the edges of the dielectric. The device has a bottom electrode and a top electrode with a switching layer disposed therebetween. The bottom electrode also has first and second sidewalls spaced apart by a first distance where the sidewalls contact the bottom surface of the switching layer. The switching layer has first and second sidewalls spaced apart with the top electrode disposed over the switching layer. The first sidewall of the switching layer overhangs the first sidewall of the bottom electrode by an overhang distance of 5 nanometers or more, and the second sidewall of the switching layer overhangs the second sidewall of the bottom electrode by an overhang distance of 5 nanometers or more.

10 Claims, 6 Drawing Sheets

(58) Field of Classification Search
CPC ............ H10N 70/8416; G11C 2213/50; G11C 2213/52; G11C 13/0007
See application file for complete search history.

(56) References Cited

U.S. PATENT DOCUMENTS

| | | | | |
|---|---|---|---|---|
| 9,461,245 | B1* | 10/2016 | Yang | H10N 70/8833 |
| 9,543,511 | B2* | 1/2017 | Sung | H10N 70/063 |
| 9,564,577 | B1* | 2/2017 | Hsu | H10N 50/10 |
| 9,564,587 | B1* | 2/2017 | Jo | H10N 70/011 |
| 9,634,243 | B1* | 4/2017 | Chuang | H10B 61/22 |
| 10,164,182 | B1* | 12/2018 | Trinh | H10N 70/24 |
| 10,374,039 | B1* | 8/2019 | Hashemi | H10D 86/201 |
| 2003/0189200 | A1* | 10/2003 | Lee | H10N 70/011 257/1 |
| 2006/0091476 | A1* | 5/2006 | Pinnow | H10N 70/8828 257/781 |
| 2007/0158633 | A1* | 7/2007 | Lai | H10N 70/231 257/E29.17 |
| 2008/0121862 | A1* | 5/2008 | Liu | G11C 13/0004 257/E47.001 |
| 2008/0149910 | A1* | 6/2008 | An | G11C 11/5678 257/4 |
| 2008/0293224 | A1* | 11/2008 | Son | H10N 70/231 257/E21.134 |
| 2011/0037108 | A1* | 2/2011 | Sugiura | H10B 61/22 257/295 |
| 2015/0228893 | A1* | 8/2015 | Narayanan | H10N 70/8833 257/4 |
| 2016/0308115 | A1* | 10/2016 | Kanaya | H10B 61/22 |
| 2017/0170394 | A1* | 6/2017 | Chen | H10N 70/826 |
| 2017/0236581 | A1* | 8/2017 | Yang | G11C 13/0028 365/148 |
| 2019/0044065 | A1* | 2/2019 | Tseng | H10N 70/24 |
| 2019/0058109 | A1* | 2/2019 | Chen | H10N 50/80 |
| 2019/0165041 | A1* | 5/2019 | Chuang | H10B 61/22 |
| 2020/0027924 | A1* | 1/2020 | Yang | G11C 13/0007 |
| 2020/0075855 | A1* | 3/2020 | Tseng | H10N 70/8836 |
| 2020/0098985 | A1* | 3/2020 | Trinh | H10N 70/24 |
| 2020/0106011 | A1* | 4/2020 | Chen | H10N 70/063 |

* cited by examiner

302 — Patterning a bottom electrode trench into a semiconductor structure.

304 — Disposing one or more liners within the trench, the one or more liners each being composed of a material that does not react with material of a yet to be disposed extended switching layer when in contact with the extended switching layer.

306 — Filling the trench with the a bottom electrode material.

308 — Planarizing excess bottom electrode material to form a bottom electrode, the bottom electrode having first and second sidewalls that are separated at a top surface of the bottom electrode by a first distance.

310 — Disposing an extended switching layer over the bottom electrode.

312 — Disposing an optional extended oxygen exchange layer (OEL) over the extended switching layer.

314 — Disposing a top electrode layer over the extended switching layer and the optional extended OEL.

316 — Lithographically patterning the extended switching layer, the optional extended OEL and the top electrode layer to form a switching layer, an OEL and a top electrode.

318 — Patterning a via into the semiconductor structure above the top electrode.

320 — Filling the via with a metal to form a metal filled via in contact with the top electrode.

RESISTIVE RANDOM ACCESS MEMORY DEVICE

GOVERNMENT RIGHTS STATEMENT

This invention was made with U.S. Government support under Agreement Nos. FA8750-11-1-0008 and FA8750-16-1-0063 awarded by the Air Force Research Labs to the SUNY Research Foundation for the State University of New York. The Government has certain rights in the invention.

TECHNICAL FIELD

The present disclosure relates to resistive random access memory (ReRAM) devices and methods of making the same. More specifically, the disclosure relates to ReRAM devices wherein a switching layer of the ReRAM devices overhangs a bottom electrode of the ReRAM devices.

BACKGROUND

Resistive random access memory (ReRAM) devices show great promise as enablers of neuromorphic computer systems. Much like a synapse in a human brain, ReRAM devices can function, not only as a digital non-volatile memory switching device, but also as an analog memory device, wherein their characteristics can be change by varying certain parameters controlling the ReRAM. Accordingly, ReRAM devices can emulate a synapse in a human brain more closely than previous devices.

The brain processes information through a network of synapses. Electrical impulses representing that information enter the synapses. The impulses stimulate a chemical signal across a boundary (or synaptic junction) of the synapses. The amount of chemical signal that gets released, and the amount of receptors that pick up the chemical signal is how the brain provides an analog-like weighted output based on the information being received.

A ReRAM device can provide an analog-like weighted output similar to that of a synapse. The ReRAM is a type of non-volatile random-access computer memory that works by changing the resistance across a dielectric solid-state material (or insulator). The ReRAM involves generating defects in a thin dielectric oxide layer, known as filaments. The filaments include oxygen vacancies (locations where the oxygen has been removed), which carry a charge and thus drift under the influence of an electric field and thermal energy.

Statistically, the filament may form anywhere in the dielectric. Problematically, if the filament forms on an edge of the dielectric, the ReRAM device may fail. Additionally, multiple filaments may form in undesirable locations.

Accordingly, there is a need for a ReRAM device, and a method of making the same, that can prevent filament formation at the edges of the dielectric. Further there is a need for a ReRAM device that can reduce the possibility of multiple filaments from being formed.

BRIEF DESCRIPTION

The present disclosure offers advantages and alternatives over the prior art by providing a ReRAM device wherein a switching layer of the ReRAM device overhangs a bottom electrode of the ReRAM device. More specifically, the switching layer may overhang the bottom electrode by at least 5 nanometers, by at least 10 nanometers or by at least 15 nanometers. Also, more specifically, the bottom electrode may be coated with one or more liners wherein the one or more liners are each composed of a material that will not react with the switching layer when in contact with the switching layer.

A resistive random access memory (ReRAM) device in accordance with one or more aspects of the present disclosure includes a bottom electrode and a top electrode with a switching layer disposed therebetween. The bottom electrode has a top surface in contact with a bottom surface of the switching layer. The bottom electrode also has first and second sidewalls spaced apart by a first distance where the sidewalls contact the bottom surface of the switching layer. The switching layer has first and second sidewalls spaced apart by a second distance that is larger than the first distance. The top electrode is disposed over the switching layer. The first sidewall of the switching layer overhangs the first sidewall of the bottom electrode by an overhang distance of 5 nanometers or more. The second sidewall of the switching layer overhangs the second sidewall of the bottom electrode by an overhang distance of 5 nanometers or more.

An alternative ReRAM device in accordance with one or more aspects of the present invention includes a bottom electrode and a top electrode with a switching layer disposed therebetween. The bottom electrode has a top surface in contact with a bottom surface of the switching layer. The top electrode is disposed over the switching layer. One or more liners are disposed over first and second sidewalls and a bottom surface of the bottom electrode. The one or more liners have first and second distal ends that are in contact with the bottom surface of the switching layer. The one or more liners are each composed of a material that does not react with the switching layer when in contact with the switching layer.

A method of forming a ReRAM device in accordance with one or more aspects of the present disclosure includes patterning a bottom electrode trench into a semiconductor structure. The trench is filled with a bottom electrode material. Excess bottom electrode material is planarized to form a bottom electrode. The bottom electrode has first and second sidewalls that are separated at a top surface of the bottom electrode by a first distance. An extended switching layer is disposed over the bottom electrode. A top electrode layer is disposed over the extended switching layer. The extended switching layer and the top electrode layer are lithographically patterned to form a switching layer and a top electrode. The switching layer includes first and second sidewalls spaced apart by a second distance that is larger than the first distance. The switching layer is positioned over the bottom electrode such that the first sidewall of the switching layer overhangs the first sidewall of the bottom electrode by at least an overhang distance, and the second sidewall of the switching layer overhangs the second sidewall of the bottom electrode by at least the overhang distance.

DRAWINGS

The disclosure will be more fully understood from the following detailed description taken in conjunction with the accompanying drawings, in which.

Figure 5:
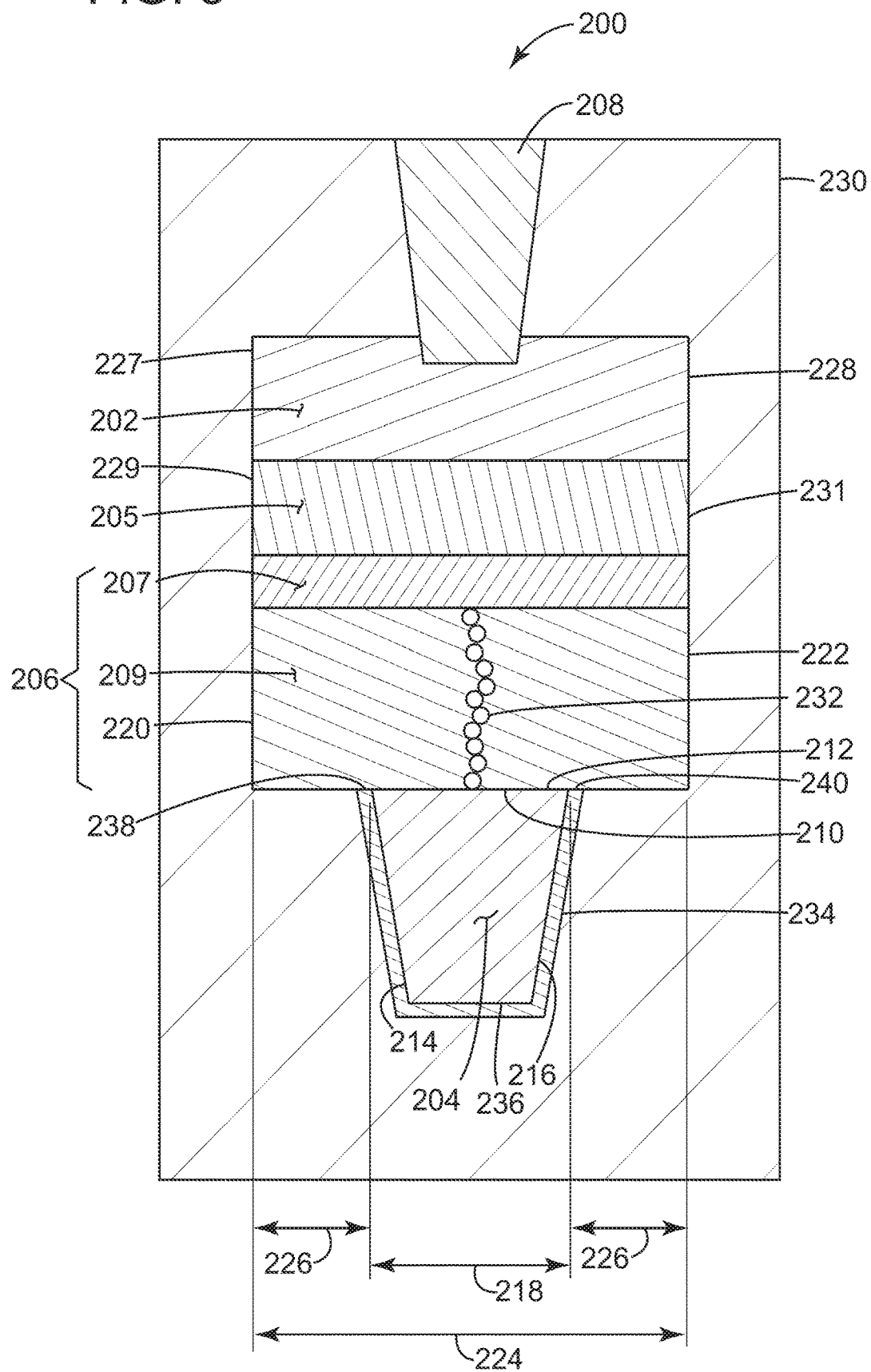

FIG. 5 depicts an example of a side view of a ReRAM device in accordance with aspects describe herein wherein one or more liners are disposed on the bottom electrode that are composed of materials which do not react with the switching layer when in contact with the switching layer; and FIG. 6 depicts an example of a process flow diagram of a method of making a ReRAM device according to aspects described herein.

DETAILED DESCRIPTION

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example may be combined with the features of other examples. Such modifications and variations are intended to be included within the scope of the present disclosure.

The terms "substantially", "approximately", "about", "relatively," or other such similar terms that may be used throughout this disclosure, including the claims, are used to describe and account for small fluctuations, such as due to variations in processing from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Figure 1:
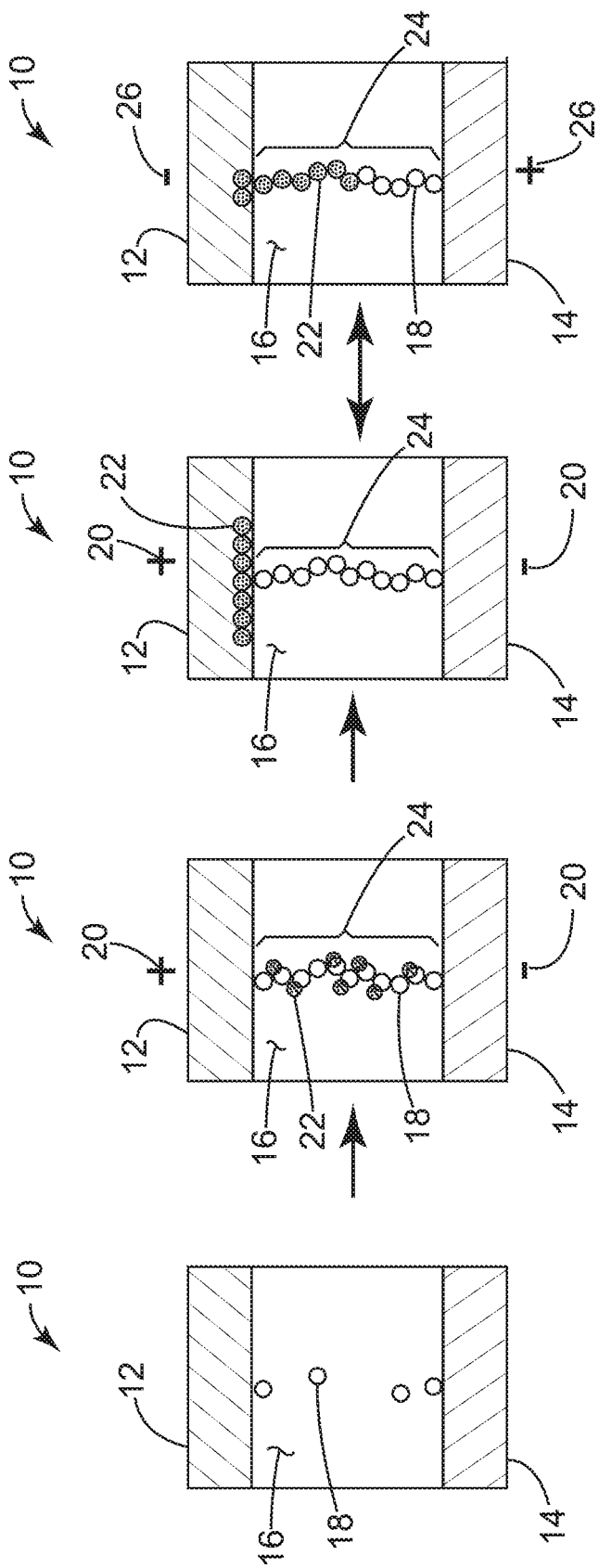
FIG. 1A depicts an example of a side view of a prior art ReRAM device at an intermediate stage of formation.
FIG. 1B depicts an example of a side view of the ReRAM device of FIG. 1A at a filament formation stage.
FIG. 1C depicts an example of a side view of the ReRAM device of FIG. 1B in a low resistive state (LRS)
FIG. 1D depicts an example of a side view of the ReRAM device of FIG. 1C in a high resistive state (HRS)

Referring to FIG. 1A an example of a side view of a prior art ReRAM device 10 at an intermediate stage of formation is presented. The ReRAM device 10 includes a metal top electrode 12, a metal bottom electrode 14 with a dielectric switching layer 16 disposed in between. The switching layer 16 is often composed of a metal oxide insulator material. Accordingly, the basic structure of the ReRAM device 10 is often referred to as a metal-insulator-metal (or MIM) structure. At this initial stage of formation, oxygen vacancies 18 are dispersed randomly throughout the switching layer 16.

The switching layer 16, in this particular case, may be hafnium oxide (HfOx). However other dielectrics may also be used for the switching layer, such as tantalum oxide, titanium oxide or other metal oxides. The top electrode 12 may be titanium nitride (TiN) and the bottom electrode 14 may be tungsten (W) in this particular case. However, other materials may also be used for the electrodes, such as copper or other metals.

Referring to FIG. 1B, an example of a side view of the ReRAM device 10 of FIG. 1A at a filament formation stage is presented. If a large enough electric field having a certain voltage bias 20 (represented by the position of the plus (+) sign and the minus (−) sign) is applied across the top and bottom electrodes 12 and 14, the atomic bonds in the switching layer 16 begin to break apart (also referred to as dielectric breakdown). As such, oxygen atoms 22, which significantly contribute to the switching layer's 16 insulating properties, can be driven out of the switching layer 16, leaving behind additional oxygen vacancies 18. Each oxygen vacancy contributes to at least 1 electron trap state within the switching layer 16, therefore increasing the conductivity and lowering the resistance of the switching layer 16.

As the oxygen vacancies 18 buildup, a filament 24 of such vacancies may be formed across the width of the switching layer 16, which provides a conductive path for current to flow between the top and bottom electrodes 12, 14. The formation of the filament significantly drops the resistance across the ReRAM device and greatly reduces the magnitude of the electric field across the top and bottom electrodes 12, 14 due to the use of a current compliance device. Because the electric field is reduced to near zero, further filament formation is stopped. Also, once the filament 24 is formed, it will remain in the switching layer 16 even when the electric field 20 is removed.

Referring to FIG. 1C, an example of a side view of the ReRAM device 10 of FIG. 1B in a low resistive state (LRS) is presented. In the ReRAM's low resistive state, most of the oxygen atoms 18 have been driven out of the filament 24, which is now composed predominantly of conductive oxygen vacancies 18. Being a non-volatile memory device, the ReRAM 18 will remain in its LRS even if the electric field 20 is removed.

Referring to FIG. 1D, an example of a side view of the ReRAM device 10 of FIG. 1C in a high resistive state (HRS) is presented. If an electric field having a reversed polarity 26 (represented by the reversed position of the plus (+) sign and the minus (−) sign) is applied, oxygen atoms 22 are driven back into the filament 24 to replace a portion of the oxygen vacancies 18. As such a significant portion of the filament 24 becomes a non-conductive insulator again, which resets the ReRAM device 10 back into a high resistive state (HRS). Again, because the ReRAM 10 is non-volatile, it will remain in this HRS even if the electric field 26 is removed.

Significantly, by varying certain parameters, such as the magnitude of the electric field and the duration of time the electric field is applied, the amount of oxygen atoms 22 and vacancies 18 that occupy the filament 24 can be controlled. As such, there can be any number of resistive states in between the two extremes of the LRS and the HRS. Accordingly, the characteristics of the ReRAM 10 can be adjusted in an analog-like fashion to emulate the function of a synapse.

Figure 2:
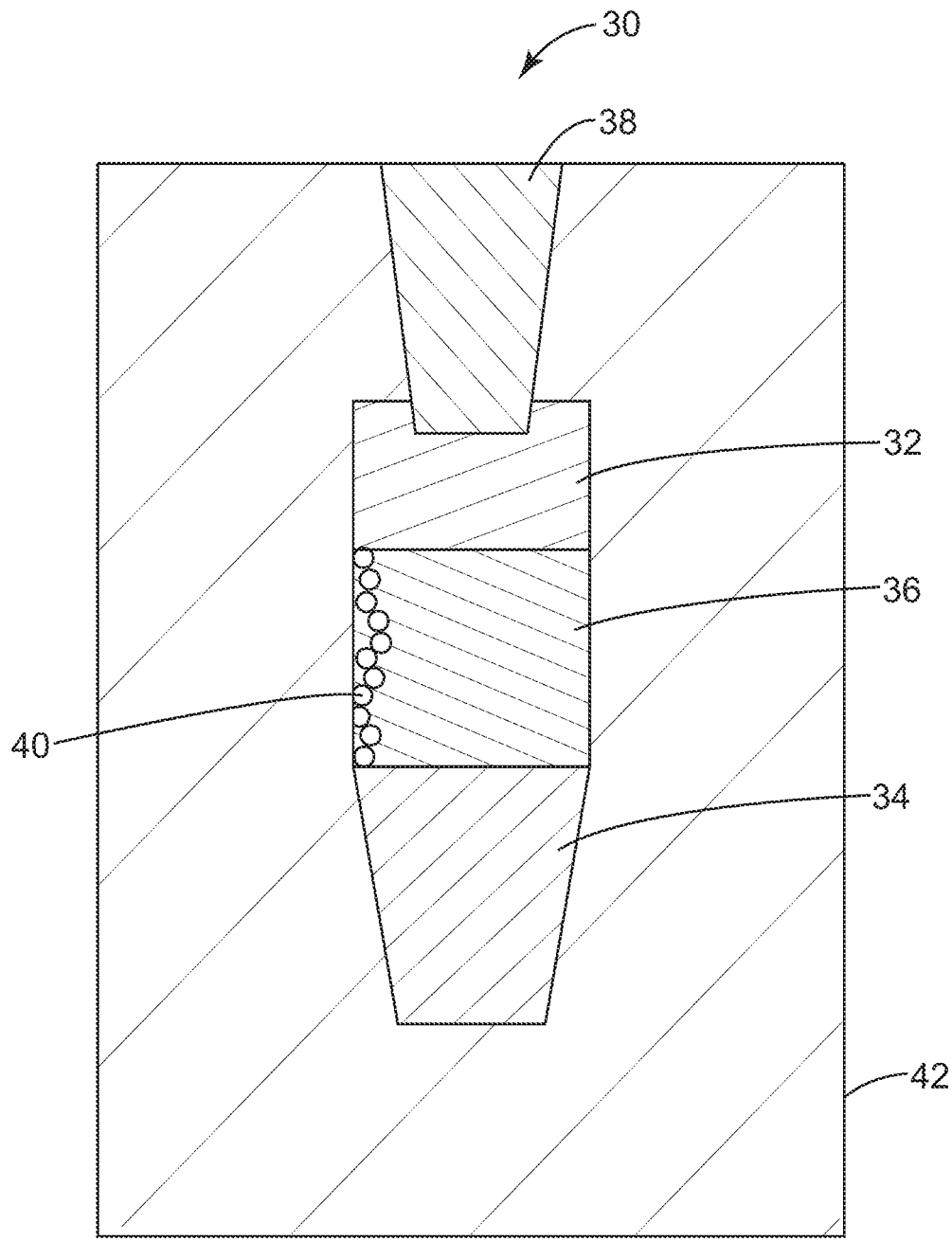
FIG. 2 depicts an example of a side view of a prior art ReRAM device having a filament formed on a sidewall of its switching layer.

Referring to FIG. 2, an example of a side view of a prior art ReRAM device 30 having a filament formed on a sidewall of its switching layer 36 is presented. The ReRAM device 30 is disposed within a semiconductor structure 42. The ReRAM device 30 includes a top electrode 32 and a bottom electrode 34 with a switching layer 36 therebetween. In this example, a top contact via 38 is used to connect the top electrode 32 of the ReRAM device 30 to other structures or devices at the back end of the line of the semiconductor structure 42.

The materials of ReRAM device 30, e.g., the electrodes 32, 34 and the switching layer 36, may be composed of the same materials as that of ReRAM device 10. The top contact via 38 may be composed of copper or other metals.

Statistically, when an electric field is applied to the ReRAM device 30 as described earlier herein, a filament 40 of oxygen vacancies may form anywhere in the switching layer 36 where the switching layer 36 contacts the top and bottom electrodes 32, 34. However, in this particular example, the filament 40 has formed on a sidewall of the switching layer 36. As such, the filament 40 is not surrounded by the material of the switching layer (in this case hafnium oxide). Instead, a portion of the filament is exposed to other materials within the semiconductor structure 42 and as such, may not perform properly. Accordingly, the ReRAM device 30 may fail.

Figure 3:
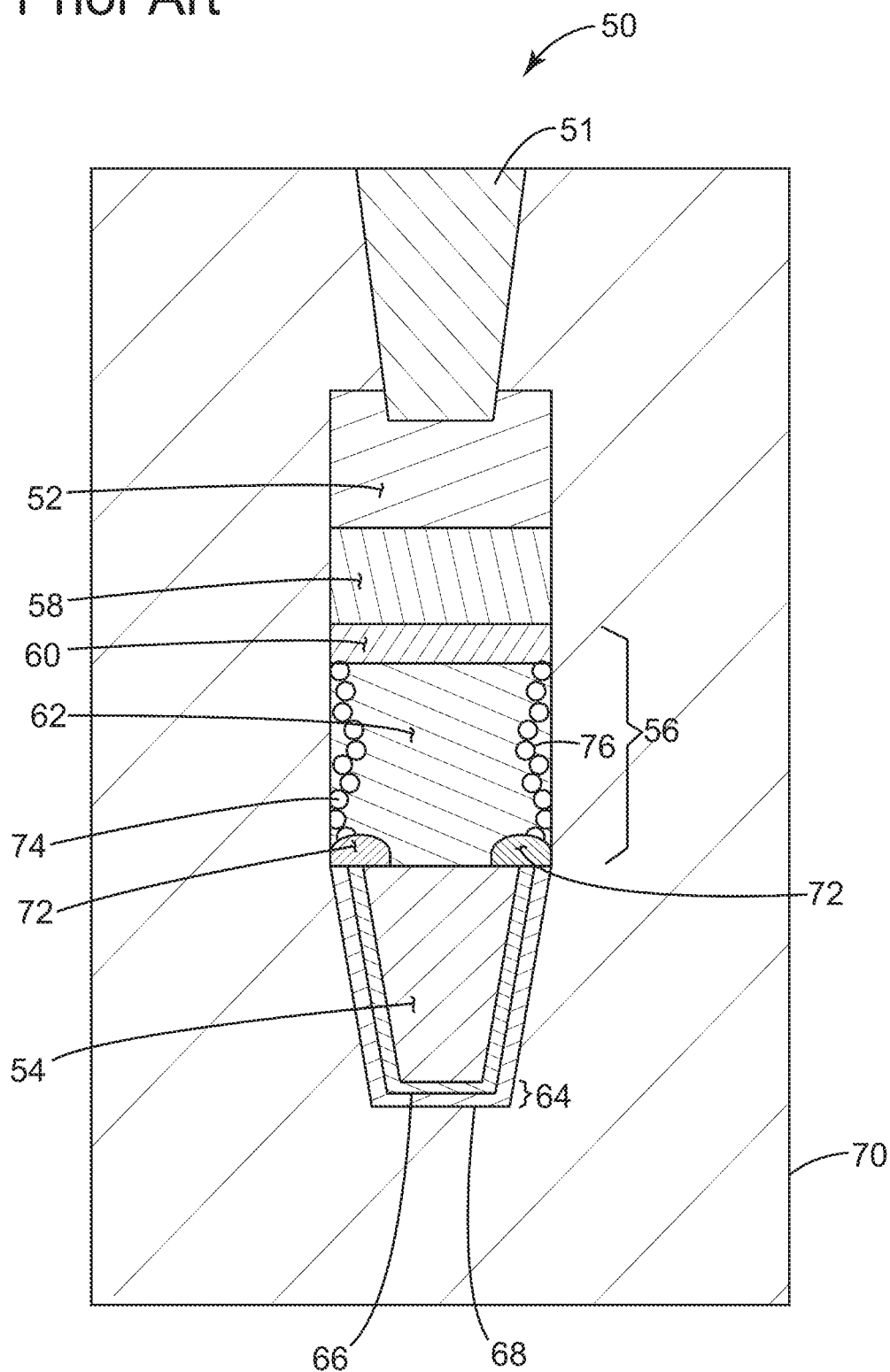
FIG. 3 depicts an example of a side view of a prior art ReRAM device wherein a liner material has oxidized a bottom portion of the switching layer, resulting in the formation of unwanted additional oxygen vacancies and multiple filaments.

Referring to FIG. 3, an example of a side view of a prior art ReRAM device 50 is presented, wherein a liner material has oxidized a bottom portion of the switching layer, resulting in the formation of unwanted additional oxygen vacancies and multiple filaments.

The ReRAM device 50 is disposed within a semiconductor structure 70. The ReRAM device 50 includes a top electrode 52 and a bottom electrode 54 with a switching layer 56 therebetween. In this example, a top contact via 51 is used to connect the top electrode 52 of the ReRAM device 50 to other structures or devices at the back end of the line of the semiconductor structure 70.

Additionally, the ReRAM device 50 includes an optional oxygen exchange layer (OEL) 58 disposed between the top electrode 52 and the switching layer 56. The OEL 58 is composed of a material designed to react with and oxidize an upper portion 60 of the switching layer 56. In this particular example, if the switching layer 56 is hafnium oxide (HfOx), then the OEL 58 may be titanium (Ti) in order to oxidize the upper portion 60.

As a result, the upper portion 60 of switching layer 56 has a lower stoichiometry, i.e., has a lower concentration of oxygen atoms, than a lower portion 62 of the switching layer 56, due to the removal of such oxygen atoms by the OEL 58. Accordingly, the upper portion 60 is a source of oxygen vacancies that may help in the formation of filaments.

Additionally, the ReRAM device 50 includes one or more liners 64 that are disposed over the sidewalls and bottom surface of the bottom electrode 54. In other words, the one or more liners 64 are disposed over a portion of a perimeter of the bottom electrode 54 that is not in contact with (i.e., not abutting) the bottom surface of the switching layer 56. However, the distal ends of the one or more liners 64 are in contact with the bottom surface of the switching layer 56.

In this particular case, the one or more liners 64 are a plurality of liners that form a stack of liners which are disposed over the sidewalls and bottom surface of the bottom electrode 54. The plurality of liners include a first liner 66 composed of titanium nitride (TiN) and a second liner 68 composed of titanium (Ti). The first liner 66 is disposed over and in contact with (i.e., abuts against) the sidewalls and bottom surface of the bottom electrode 54. The second liner 68 is disposed over and in contact with (i.e. abuts against) the first liner 66. Though the second liner 68 is also disposed over the sidewalls and bottom surface of the bottom electrode 54, it does not actually make contact with the sidewalls and bottom surface of the bottom electrode 54.

The one or more liners 64 prevent atoms in the bottom electrode 54 from drifting into and contaminating the adjacent material in the semiconductor structure 70. However, in much the same way that the Ti of the OEL 58 oxidizes the upper portion 60 of the HfOx switching layer 56, the Ti of the distal ends of the second liner 68 will also oxidize that portion of the switching layer 56 they are in contact with. As a result, two low oxygen regions 72 are inadvertently formed proximate the bottom surface of the switching layer 56.

The low oxygen regions 72 are an additional source of oxygen vacancies that may form multiple filaments 74, 76 in undesirable areas (e.g., on the sidewalls) of the switching layer 56. Such multiple filaments may significantly reduce the predictable behavior of the switching device 50.

Moreover, with the upper portion 60 and low oxygen regions 72 functioning as sources of oxygen vacancies, it may become difficult to drive enough oxygen atoms back into the filaments 74, 76 to reset the ReRAM device 50 back into its high resistance state (HRS). In extreme cases, the ReRAM device 50 may not be able to be reset at all.

Figure 4:
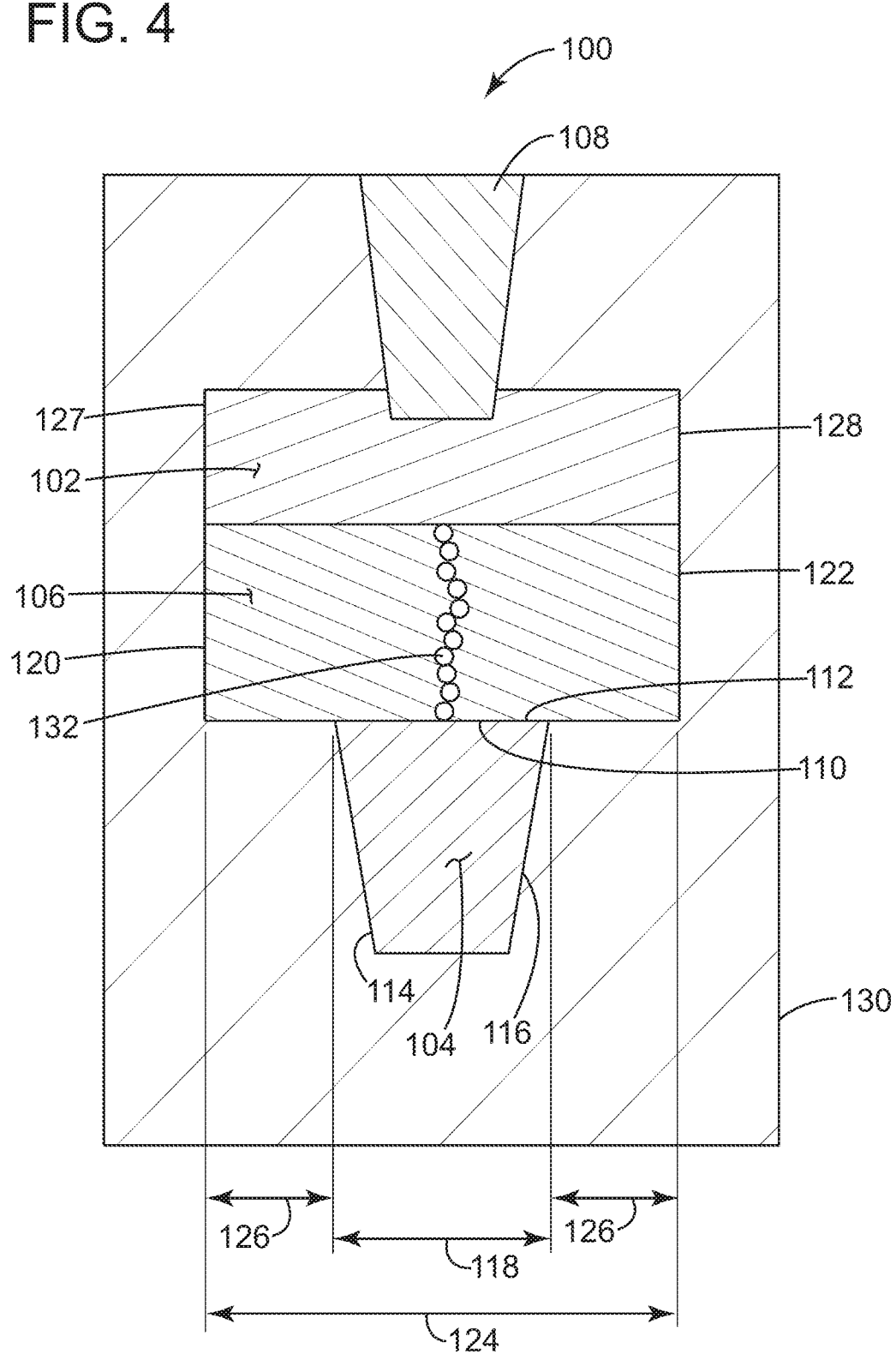
FIG. 4 depicts an example of a side view of a ReRAM device 100 in accordance with aspects describe herein wherein the switching layer overhangs the bottom electrode by a predetermined overhang distance.

Referring to FIG. 4, an example of a side view of a ReRAM device 100 in accordance with aspects describe herein is presented. In the ReRAM device 100, the switching layer 106 advantageously overhangs the bottom electrode 104 by a predetermined overhang distance 126.

The ReRAM device 100 is disposed within a semiconductor structure 130. The ReRAM device 100 includes a top electrode 102 and a bottom electrode 104 with a switching layer 106 therebetween. In this example, a metal filled top contact via 108 is used to connect the top electrode 102 of the ReRAM device 100 to interconnects or other structures (not shown) at the back-end of the semiconductor structure 130. The bottom electrode 104 may be connected to contact studs (not shown) used to contact front-end devices such as transistors, capacitors, resistors or the like.

Though not shown in FIG. 4, the ReRAM device 100 may also include an optional OEL (similar to the OEL 205 seen in FIG. 5). Such an OEL would be disposed between the top electrode 102 and the switching layer 106. The OEL would be composed of a material designed to react with and oxidize an upper portion of the switching layer 106. As a result, the upper portion of switching layer would have a lower concentration of oxygen atoms than a lower portion of the switching layer 106, due to the removal of such oxygen atoms by the OEL. Accordingly, the upper portion of the switching layer 106 would function as a source of oxygen vacancies that may help in the formation of filaments.

The bottom electrode 104 has a top surface 110 in contact with a bottom surface 112 of the switching layer 106. The bottom electrode 104 also has a first sidewall 114 and second sidewall 116 that are spaced apart by a first distance 118 where the sidewalls 114, 116 contact the bottom surface 112 of the switching layer 106.

The bottom electrode 104 may be composed of a metal. In the example illustrated in FIG. 4, the metal may be tungsten. However, other metals may be used for the bottom electrode 104. For example, the bottom electrode 104 may be composed of copper, titanium nitride or the like.

The switching layer 106 has a first sidewall 120 and second sidewall 122 that are spaced apart by a second distance 124 that is larger than the first distance 118. As such, the first sidewall 120 of the switching layer 106 overhangs the first sidewall 114 of the bottom electrode 104 by at least an overhang distance 126. Also the second sidewall 122 of the switching layer 106 overhangs the second sidewall 116 of the bottom electrode 104 by at least the overhang distance 126.

The top electrode 102 is disposed over the switching layer 106. The top electrode 102 also includes a first sidewall 127 and a second sidewall 128. Due to manufacturing processes, the first and second sidewalls 127, 128 of the top electrode 102 may be substantially aligned with the first and second sidewalls 120, 122 of the switching layer 106 respectively.

The switching layer 106 may be composed of such dielectric materials as hafnium oxide, tantalum oxide, titanium oxide or the like. It is also possible that the switching layer may be composed of a plurality of such dielectric materials. The switching layer may be formed with any thickness that is appropriate for the application. For example, the switching layer 106 may be composed of a thickness that is within a range of 2 to 20 nanometers.

The top and bottom electrodes 102, 104 may be composed of such metallic materials as tungsten, copper, titanium nitride or the like. It is also possible that the top and bottom electrodes 102, 104 may be composed of a plurality of such metallic materials. It is also possible that the top and bottom electrodes 102, 104 are composed of different materials. The top and bottom electrodes 102, 104 may be formed with any thickness that is appropriate for the application. For example, the top and bottom electrodes 102, 104 may be composed of a thickness that is within a range of 5 to 200 nanometers.

The ReRAM device 100 includes a filament 132 of oxygen vacancies that form a controllable conductive path between the first and second electrodes 102, 104. During operation, by varying such characteristics as strength and duration of an applied electric field, oxygen atoms can be moved into and out of the filament to control the conductivity of the ReRAM device 100 between the extremes of a high resistive state (HRS) and a low resistive state (LRS). During formation, the filament can statistically form anywhere between the first and second electrodes 102, 104.

Advantageously however, because the sidewalls 120, 122 of switching layer 106 overhang the sidewalls 114, 116 of the bottom electrode by a predetermined overhang distance 126, the filament 132 cannot form along the sidewalls 120, 122 of the switching material. Accordingly, the chances of the filament 132 failing to function properly due to inadvertent contact with materials outside of switching layer 106 is greatly reduced.

The predetermined overhang distance 126 may take into consideration several parameters. Examples of such parameters include the tolerances of the alignment processes between the bottom electrode 104 and the switching layer 106, the degree of shrinkage of the bottom electrode 104 and switching layer 106 during various etching processes and the estimated size of the filament 132 to be formed.

Depending on such parameters, the first sidewall 120 of the switching layer 106 may be predetermined to overhang the first sidewall 114 of the bottom electrode 104 by an overhang distance 126 of 5 nanometers or more. Additionally, the second sidewall 122 of the switching layer 106 may be predetermined to overhang the second sidewall 116 of the bottom electrode 104 by the same overhang distance 126 of 5 nanometers or more. It is also possible that the two overhang distances 126, may be predetermined to be a different distance.

Also, depending on such parameters, the first sidewall 120 of the switching layer 106 may be predetermined to overhang the first sidewall 114 of the bottom electrode 104 by an overhang distance 126 of 10 nanometers or more. Additionally, the second sidewall 122 of the switching layer 106 may be predetermined to overhang the second sidewall 116 of the bottom electrode 104 by the same overhang distance 126 of 10 nanometers or more. It is also possible that the two overhang distances 126, may be predetermined to be a different distance.

Also, depending on such parameters, the first sidewall 120 of the switching layer 106 may be predetermined to overhang the first sidewall 114 of the bottom electrode 104 by an overhang distance 126 of 15 nanometers or more. Additionally, the second sidewall 122 of the switching layer 106 may be predetermined to overhang the second sidewall 116 of the bottom electrode 104 by the same overhang distance 126 of 15 nanometers or more. It is also possible that the two overhang distances 126, may be predetermined to be a different distance.

Referring to FIG. 5, an example of a side view of a ReRAM device 200 in accordance with aspects described herein is presented. In the ReRAM device 200, the switching layer 206 advantageously overhangs the bottom electrode 204 by a predetermined overhang distance 226. Additionally, one or more liners 234 are disposed on the bottom electrode 204 that are composed of materials which advantageously do not react with the switching layer 206 when in contact with the switching layer 206.

The ReRAM device 200 is disposed within a semiconductor structure 230. The ReRAM device 200 includes a top electrode 202 and a bottom electrode 204 with a switching layer 206 therebetween. In this example, a metal filled top contact via 208 is used to connect the top electrode 202 of the ReRAM device 200 to interconnects or other structures (not shown) at the back-end of the semiconductor structure 230. The bottom electrode 204 may be connected to contact studs (not shown) used to contact front-end devices such as transistors, capacitors, resistors or the like.

In this example, a metal filled top contact via 208 is used to connect the top electrode 202 of the ReRAM device 200 to interconnects or other structures (not shown) at the back-end of the semiconductor structure 230. The bottom electrode 204 may be connected to contact studs (not shown) used to contact front-end devices such as transistors, capacitors, resistors or the like.

The ReRAM device 200 also includes an optional oxygen exchange layer (OEL) 205. The OEL 205 is disposed between the top electrode 202 and the switching layer 206. The OEL 205 is composed of a material designed to react with and oxidize an upper portion 207 of the switching layer 206. As a result, the upper portion 207 of switching layer 206 has a lower concentration of oxygen atoms than a lower portion 209 of the switching layer 206, due to the removal of such oxygen atoms by the OEL 205. Accordingly, the upper portion 207 of the switching layer 206 functions as a source of oxygen vacancies that may help in the formation of filament 232.

The bottom electrode 204 has a top surface 210 in contact with a bottom surface 212 of the switching layer 206. The bottom electrode 204 also has a first sidewall 214 and second sidewall 216 that are spaced apart by a first distance 218 where the sidewalls 214, 216 contact the bottom surface 212 of the switching layer 206.

The bottom electrode 204 may be composed of a metal. In the example illustrated in FIG. 5, the metal may be tungsten. However, other metals may be used for the bottom electrode 204. For example, the bottom electrode 204 may be composed of copper, titanium nitride or the like.

The switching layer 206 has a first sidewall 220 and second sidewall 222 that are spaced apart by a second distance 224 that is larger than the first distance 218. As such, the first sidewall 220 of the switching layer 206 overhangs the first sidewall 214 of the bottom electrode 204 by a predetermined overhang distance 226. Also the second sidewall 222 of the switching layer 206 overhangs the second sidewall 216 of the bottom electrode 204 by the predetermined overhang distance 226.

The top electrode 202 is disposed over the OEL 205 and the switching layer 206. The top electrode 202 also includes a first sidewall 227 and a second sidewall 228. Further, the OEL 205 includes a first sidewall 229 and a second sidewall 231. Due to manufacturing processes, the first and second sidewalls 227, 228 of the top electrode 202, as well as the first and second sidewalls 229, 231 of the OEL 205, may be substantially aligned with the first and second sidewalls 220, 222 of the switching layer 206 respectively.

The switching layer 206 may be composed of such dielectric materials as hafnium oxide, tantalum oxide, titanium oxide, niobium oxide or the like. It is also possible that the switching layer may be composed of a plurality of such dielectric materials. The switching layer may be formed with any thickness that is appropriate for the application. For example, the switching layer 206 may be composed of a thickness that is within a range of 2 to 20 nanometers.

The top and bottom electrodes 202, 204 may be composed of such metallic materials as tungsten, copper, titanium nitride or the like. It is also possible that the top and bottom electrodes 202, 204 may be composed of a plurality of such metallic materials. It is also possible that the top and bottom electrodes 202, 204 are composed of different materials. The top and bottom electrodes 202, 204 may be formed with any thickness that is appropriate for the application. For example, the top and bottom electrodes 202, 204 may be composed of a thickness that is within a range of 5 to 200 nanometers.

The OEL 205 is composed of a material designed to react with and oxidize the upper portion 207 of the switching layer 206. In this particular example, if the switching layer 206 is hafnium oxide (HfOx), then the OEL 205 may be titanium (Ti) in order to oxidize the upper portion 207 of the switching layer 206.

However, the OEL 205 may be composed of other materials as well. For example, the OEL 205 may be composed of hafnium, zirconium, titanium, tantalum, or the like.

The ReRAM also includes one or more liners 234 that prevent atoms in the bottom electrode 204 from drifting into and contaminating the adjacent material in the semiconductor structure 230. The one or more liners 234 are disposed over the first sidewall 214 and the second sidewall 216 of the bottom electrode 204. Additionally, the one or more liners 234 are also disposed over a bottom surface 236 of the bottom electrode 204. The first and second sidewalls 214, 216 and the bottom surface 236 form a portion of a perimeter of the bottom electrode 204 that is not in contact with the bottom surface 212 of the switching layer 206.

However, the one or more liners 234 have a first distal end 238 and second distal end 240 that are in contact with the bottom surface 212 of the switching layer 206. Advantageously though, the one or more liners 234 are composed of a material that does not react with the switching layer 206 when in contact with the switching layer 206. By way of example, if the switching layer 206 were composed of hafnium oxide, then the one or more liners 234 may be composed of TiN.

As such, the distal ends 238, 240 of the one or more liners will not oxidize that portion of the switching layer 206 they are in contact with. As a result, low oxygen regions, similar to the upper portion 207 of the switching layer 206, will not be inadvertently formed proximate the bottom surface 212 of the switching layer 206. As a result, the possibility of multiple filaments being formed will be greatly reduced. As such, the predictability of the switching behavior of the ReRAM device 200 will be significantly enhanced.

Though the one or more liners 234 are shown in this example as being composed of TiN, other materials may also be used. For example, the one or more liners 234 may be composed of titanium nitride, tantalum nitride, iridium, ruthenium or the like.

Also, even though the one or more liner 234 are illustrated in this example as being one liner, the one or more liners 234 may be a plurality of liners composed of a plurality of materials. Similar to the way liners 66 and 68 form a stack of one or more liners 64 in FIG. 3, the plurality of the one or more liners 234 would form a stack of liners, wherein each liner in the stack would be disposed over the sidewalls 214, 216 and bottom surface 236 of the bottom electrode 204. However, only the innermost liner of the stack would be in contact with (i.e., abut against) the sidewalls 214, 216 and bottom surface 236 of the bottom electrode 204.

The ReRAM device 200 includes a filament 232 of oxygen vacancies that form a controllable conductive path between the first and second electrodes 202, 204. During operation, by varying such characteristics as strength and duration of an applied electric field, oxygen atoms can be moved into and out of the filament 232 to control the conductivity of the ReRAM device 200 between the extremes of a high resistive state (HRS) and a low resistive state (LRS). During formation, the filament can statistically form anywhere between the first and second electrodes 202, 204.

Advantageously however, because the sidewalls 220, 222 of switching layer 206 overhang the sidewalls 214, 216 of the bottom electrode by a predetermined overhang distance 226, the filament 232 cannot form along the sidewalls 220, 222 of the switching material. Accordingly, the chances of the filament 232 failing to function properly due to inadvertent contact with other materials of semiconductor structure 230 that are located outside of switching layer 206 is greatly reduced.

The predetermined overhang distance 224 may take into consideration several parameters. Examples of such parameters include the tolerances of the alignment processes between the bottom electrode 204 and the switching layer 206, the degree of shrinkage of the bottom electrode 204 and switching layer 206 during various etching processes and the estimated size of the filament 232 to be formed.

Depending on such parameters, the first sidewall 220 of the switching layer 206 may be predetermined to overhang the first sidewall 214 of the bottom electrode 204 by an overhang distance 226 of 5 nanometers, 10 nanometers, 15 nanometers or more. Additionally, the second sidewall 222 of the switching layer 206 may be predetermined to overhang the second sidewall 216 of the bottom electrode 204 by the same overhang distance 226 of 5 nanometers, 10 nanometers, 15 nanometers or more. It is also possible that the two overhang distances 226, may be predetermined to be a different distance.

Referring to FIG. 6, an example of a process flow diagram of a method 300 of making a ReRAM device according to aspects described herein is presented. In this example, the method 300 may be utilized to manufacture ReRAM device 200. However, other ReRAM devices (such as, for example ReRAM device 100) may also be formed using variations of method 300.

The method begins at 302, where a bottom electrode trench is patterned and etched into a dielectric material of the semiconductor structure 230. The patterning may be done by well-known lithographic patterning techniques. The etching may be by an anisotropic method such as by a reactive ion etching (RIE) process.

The method then proceeds to 304, wherein one or more liners 234 are disposed within the trench. The one or more liners 234 are each composed of a material that does not react with material of a yet to be disposed extended switching layer when in contact with the extended switching layer. The one or more liners may be disposed within the trench using such deposition techniques as atomic layer deposition (ALD), chemical vapor deposition (CVD), physical vapor deposition (PVD), sputtering, evaporation or the like. The one or more liner material may be titanium nitride (TiN), tantalum nitride (TaN), iridium (Ir), ruthenium (Ru) or the like.

The method then proceeds to 306, wherein the trench is filled with the a bottom electrode material. The trench may be filled using such deposition techniques as sputtering, electro-plating, CVD, PVD, evaporation or the like. The bottom electrode material may be W, Co, Cu, TiN or the like.

The method then proceeds to 308, wherein excess bottom electrode material is planarized to form the bottom electrode 204. The bottom electrode 204 has first and second sidewalls 214, 216 that are separated at the top surface 210 of the bottom electrode 204 by a first distance 218. The bottom electrode material may be planarized using chemical mechanical planarization (CMP) or other similar techniques.

The method then proceeds to 310, wherein the extended switching layer is disposed over the bottom electrode 204. The extended switching layer may be disposed by such techniques as ALD, CVD, PVD or the like. The extended switching layer may be composed of material such as HfOx, Ti, TiN or the like.

The method then proceeds to 312, wherein an optional extended oxygen exchange layer (OEL) is disposed over the extended switching layer. The extended OEL may be disposed by such techniques as ALD, CVD, PVD or the like. The extended OEL may be composed of material such as Ti, Zr, Hf, Nb, Ta or the like.

The method then proceeds to 314, wherein a top electrode layer is disposed over the extended switching layer and the optional extended OEL. The top electrode layer may be disposed by such techniques as ALD, CVD, PVD or the like. The top electrode layer may be composed of material such as TaN, Ir, Ru, W, TiN or the like.

The method then proceeds to 316, wherein the extended switching layer, the optional extended OEL and the top electrode layer are lithographically patterned to form the switching layer 206, the OEL 205 and the top electrode 202. The switching layer 206 is patterned such that it has first and second sidewalls 220, 222 that are separated by a second distance 224, wherein the second distance 224 is greater than the first distance 218. The switching layer 206 is also patterned such that first sidewall 220 of the switching layer 206 overhangs the first sidewall 214 of the bottom electrode 204 by at least an overhang distance of 226. The switching layer 206 is also patterned such that second sidewall 222 of the switching layer 206 overhangs the second sidewall 216 of the bottom electrode 204 by at least the overhang distance of 226.

The stack of the extended switching layer, extended OEL and top electrode layer may be patterned by first coating the stack with photoresist material and then using photolithographic techniques to form a pattern in the photoresist material. The pattern may then be etched down through the stack to form the switching layer 206, OEL 205 and top electrode 202. The etching may be an anisotropic etch, such as a RIE process, to position the switching layer 206 over the bottom electrode 204 and to align the sidewalls of the switching layer 206 with the sidewalls of the OEL 205 and top electrode 202.

The method then proceeds with a Si3N4 encapsulation of the patterned ReRAM structure and a deposition of SiO2 for the V1/M2 metallization layer. Followed by 318, wherein a via is patterned above the top electrode 202. The via may be formed using photolithographic RIE techniques as described earlier.

The method then proceeds to 320, wherein the via is filled with a metal to form the metal filled via 208. The metal that fills the via may be Al, Cu or the like. The via may be filled using such techniques as sputtering, CVD, PVD, ALD, electro-plating or the like.

It should be appreciated that all combinations of the foregoing concepts and additional concepts discussed in greater detail herein (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Although the invention has been described by reference to specific examples, it should be understood that numerous changes may be made within the spirit and scope of the inventive concepts described. Accordingly, it is intended that the disclosure not be limited to the described examples, but that it have the full scope defined by the language of the following claims.

What is claimed is:

1. A resistive random access memory (ReRAM) device, comprising:
    a bottom electrode and a top electrode with a switching layer disposed therebetween;
    the bottom electrode having a top surface in contact with a bottom surface of the switching layer, and the bottom electrode further having a bottom surface, wherein the top surface of the bottom electrode overhangs the bottom surface of the bottom electrode at, at least, a predetermined overhang distance;
    wherein the top electrode disposed over the switching layer;
    one or more liners disposed over first and second sidewalls and a bottom surface of the bottom electrode, the one or more liners having first and second distal ends that are in contact with the bottom surface of the switching layer;
    wherein the one or more liners are each composed of a material that does not react with the switching layer when in contact with the switching layer; and
    wherein, upon an electric field being applied between the top electrode and bottom electrode, a filament of oxygen atoms forms a controllable conductive path between the top electrode and bottom electrode, and selectively varying characteristics of the electric field moves oxygen atoms into and out of the filament to control a conductivity of the top electrode and bottom electrode between a high resistive state and a low resistive state.

2. The ReRAM device of claim 1, comprising:
    the bottom electrode having a first sidewall and second sidewall spaced apart by a first distance where the first sidewall and second sidewall contact the bottom surface of the switching layer; and the switching layer having first and second sidewalls spaced apart by a second distance that is larger than the first distance.

3. The ReRAM device of claim 1, comprising an oxygen exchange layer (OEL) disposed between the switching layer and the top electrode, wherein the OEL reacts with the switching layer to remove some of the oxygen atoms from an upper portion of the switching layer.

4. The ReRAM device of claim 1, wherein the switching layer is composed of at least one of hafnium oxide, tantalum oxide, titanium oxide and niobium oxide.

5. The ReRAM device of claim 1, wherein the top and bottom electrodes are composed of at least one of tungsten, copper and titanium nitride.

6. The ReRAM device of claim 1, wherein the one or more liners are composed of at least one of titanium nitride, tantalum nitride, iridium and ruthenium.

7. The ReRAM device of claim 1, wherein the switching layer is in a thickness within a range of 2 to 20 nanometers.

8. The ReRAM device of claim 1, wherein the top and bottom electrodes are each at a thickness in a range of 5 to 200 nanometers.

9. A semiconductor structure, comprising:
- a bottom electrode having a top surface and a bottom surface, and a first sidewall and second sidewall spaced apart by a first distance;
- a top electrode above the bottom electrode;
- a switching layer between the top electrode and bottom electrode, the switching layer having a top surface and bottom surface, the switching layer having a first sidewall and second sidewall spaced apart by a second distance that is larger than the first distance of the bottom electrode;
- wherein the top surface of the bottom electrode in contact with the bottom surface of the switching layer, and the first sidewall and second sidewall of the bottom electrode contact the bottom surface of the switching layer;
- wherein the top electrode disposed over the switching layer;

wherein the first sidewall of the switching layer overhangs the first sidewall of the bottom electrode by a predetermined overhang distance;
- wherein the second sidewall of the switching layer overhangs the second sidewall of the bottom electrode by a predetermined overhang distance; and
- wherein, upon an electric field being applied between the top electrode and bottom electrode, a filament of oxygen atoms forms a controllable conductive path between the top electrode and bottom electrode, and selectively varying characteristics of the electric field move oxygen atoms into and out of the filament to control a conductivity of the top electrode and bottom electrode between a high resistive state and a low resistive state.

10. The semiconductor structure of claim 9, wherein:
the predetermined overhang distance of the first sidewall of the switching layer overhanging the first sidewall of the bottom electrode is 10 nanometers or more; and the predetermined overhang distance of the second sidewall of the switching layer overhanging the second sidewall of the bottom electrode is of 10 nanometers or more.

* * * * *